United States Patent
Yoshida

(10) Patent No.: US 10,496,521 B2
(45) Date of Patent: Dec. 3, 2019

(54) DEBUG SYSTEM AND SEMICONDUCTOR DEVICE

(71) Applicant: Renesas Electronics Corporation, Koutou-ku, Tokyo (JP)

(72) Inventor: Makoto Yoshida, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 168 days.

(21) Appl. No.: 15/840,437

(22) Filed: Dec. 13, 2017

(65) Prior Publication Data

US 2018/0225193 A1  Aug. 9, 2018

(30) Foreign Application Priority Data

Feb. 7, 2017  (JP) .................................. 2017-020311

(51) Int. Cl.
*G06F 11/00* (2006.01)
*G06F 11/36* (2006.01)

(52) U.S. Cl.
CPC ........ *G06F 11/3636* (2013.01); *G06F 11/362* (2013.01); *G06F 11/3648* (2013.01)

(58) Field of Classification Search
CPC . G06F 11/362; G06F 11/3636; G06F 11/3648
See application file for complete search history.

(56) References Cited

U.S. PATENT DOCUMENTS

| | | | | |
|---|---|---|---|---|
| 5,850,562 A | * | 12/1998 | Crump | G06F 11/3466 713/1 |
| 6,182,208 B1 | * | 1/2001 | Peri | G06F 11/3648 712/227 |
| 2005/0010908 A1 | * | 1/2005 | Funk | G06F 11/3648 717/124 |
| 2005/0060690 A1 | * | 3/2005 | Tung | G06F 11/3636 717/129 |
| 2006/0200807 A1 | * | 9/2006 | Bates | G06F 11/362 717/129 |
| 2008/0155237 A1 | * | 6/2008 | Dobson | G06F 9/325 712/241 |
| 2009/0222692 A1 | * | 9/2009 | Robertson | G06F 11/2236 714/25 |

(Continued)

FOREIGN PATENT DOCUMENTS

JP   H06-103110 A   4/1994

*Primary Examiner* — Joshua P Lottich
(74) *Attorney, Agent, or Firm* — Shapiro, Gabor and Rosenberger, PLLC

(57) ABSTRACT

When a program counter value during execution of a target program is an execution start address or less or is larger than the execution start address and is equal to or larger than minimum address among a plurality of addresses associated with a plurality of break points, a break circuit interrupts an execution of the target program, and during the interruption of the execution of the target program, and when the program counter value does not match with anyone of the plurality of break points, a debug control unit sets the program counter value as the execution start address to a first register, sets to a second register an address that is larger than the program counter value and is minimum among the plurality of break points as the minimum address, and resumes the execution of the target program from the execution start address.

8 Claims, 16 Drawing Sheets

(56) References Cited

U.S. PATENT DOCUMENTS

| | | | |
|---|---|---|---|
| 2010/0023811 A1* | 1/2010 | Moyer | G06F 11/3648 |
| | | | 714/47.1 |
| 2010/0049955 A1* | 2/2010 | Moyer | G06F 9/3005 |
| | | | 712/227 |
| 2011/0126175 A1* | 5/2011 | Suizu | G06F 11/3636 |
| | | | 717/129 |
| 2011/0154111 A1* | 6/2011 | Beilmann | G06F 11/362 |
| | | | 714/34 |
| 2016/0231376 A1* | 8/2016 | Kris | G01R 31/2851 |

* cited by examiner

HW BREAK POINT SETTING TABLE 118

| BP1 |
| BP2 |
| BP3 |
|     |
|     |

Fig. 4

EXECUTION EXAMPLE (1)
CASE WHERE BRANCH COMMAND IS NOT GENERATED FROM
PROGRAM START TO BREAK POINT

|  |  | ADDRESS |
|---|---|---|
|  |  | 0000 |
|  | BP1 | 0001 |
|  |  | 0002 |
| EXECUTION START ADDRESS |  | 0003 |
|  |  | 0004 |
|  |  | 0005 |
|  |  | 0006 |
|  | BP2 | 0007 |
|  |  | 0008 |
|  |  | 0009 |
|  |  | 0010 |
|  | BP3 | 0011 |
|  |  | 0012 |

Fig. 7

EXECUTION EXAMPLE (2)
CASE WHERE THERE IS BRANCH COMMAND FROM PROGRAM START TO LATEST BREAK POINT

| | ADDRESS | |
|---|---|---|
| | 0000 | |
| BP1 | 0001 | |
| | 0002 | |
| EXECUTION START ADDRESS | 0003 | |
| | 0004 | |
| | 0005 | BRUNCH A |
| | 0006 | |
| BP2 | 0007 | |
| | 0008 | |
| | 0009 | A |
| | 0010 | |
| BP3 | 0011 | |
| | 0012 | |

Fig. 8

EXECUTION EXAMPLE (3)
CASE WHERE THERE IS BRANCH COMMAND FROM PROGRAM
START TO LATEST BREAK POINT,
AND BRANCH DESTINATION IS OUTSIDE RANGE

| | ADDRESS | |
|---:|:---:|:---|
| | 0000 | B |
| BP1 | 0001 | |
| | 0002 | |
| EXECUTION START ADDRESS | 0003 | |
| | 0004 | |
| | 0005 | BRUNCH B |
| | 0006 | |
| BP2 | 0007 | |
| | 0008 | |
| | 0009 | |
| | 0010 | |
| BP3 | 0011 | |
| | 0012 | |

Fig. 9

EXECUTION EXAMPLE (4)
CASE WHERE THERE IS BRANCH COMMAND FROM PROGRAM
START TO LATEST BREAK POINT,
AND BRANCH DESTINATION IS AT PROGRAM START POSITION

| | | ADDRESS | |
|---|---|---|---|
| | | 0000 | |
| | | 0001 | |
| | | 0002 | |
| EXECUTION START ADDRESS | BP1 | 0003 | C |
| | | 0004 | |
| | | 0005 | BRUNCH C |
| | | 0006 | |
| | BP2 | 0007 | |
| | | 0008 | |
| | | 0009 | |
| | | 0010 | |
| | BP3 | 0011 | |
| | | 0012 | |

Fig. 10

HW BREAK POINT SETTING TABLE     501

| 502 | 503 | 504 |
|---|---|---|
| BP1 | PASS COUNTER 1 | NUMBER OF TIMES OF ESTABLISHMENT 1 |
| BP2 | PASS COUNTER 2 | NUMBER OF TIMES OF ESTABLISHMENT 2 |
| BP3 | PASS COUNTER 3 | NUMBER OF TIMES OF ESTABLISHMENT 3 |
|  |  |  |
|  |  |  |
|  |  |  |

Fig. 12

DEBUG SYSTEM AND SEMICONDUCTOR DEVICE

CROSS-REFERENCE TO RELATED APPLICATIONS

This application is based upon and claims the benefit of priority from Japanese patent application No. 2017-020311, filed on Feb. 7, 2017, the disclosure of which is incorporated herein in its entirety by reference.

BACKGROUND

1. Field of the Invention

The present invention relates to a debug system and a semiconductor device. For example, the present invention relates to a debug system and a semiconductor device which set a plurality of break points.

2. Description of Related Art

Japanese Unexamined Patent Application Publication No. H06-103110 discloses a technique related to a break point setting method. The technique according to Japanese Unexamined Patent Application Publication No. H06-103110 stops execution of a program when an execution address of the program reaches a break point. Further, when a branch command of the program is generated, the execution of the program is interrupted, and when a branch destination of the branch command is outside a range of a program execution resumption address or more and a break point or more which is the closest to the execution resumption address, a branch trace mechanism resumes the execution of the program.

SUMMARY

However, the technique according to Japanese Unexamined Patent Application Publication No. H06-103110 performs different processing when, in response to reach to the break point, execution of the program is stopped and when a branch command is generated and the execution of the program is interrupted. Hence, there is a problem that a processing structure is complicated.

Other tasks and new features will be made more apparent from description of this description and the accompanying drawings.

According to one embodiment, a debug system is configured to interrupt execution of a target program when a program counter value during execution of the target program is an execution start address or less, or is larger than the execution start address and is a minimum address or more among a plurality of addresses associated with a plurality of break points, and the debug control unit is configured to, during the interruption of the execution of the target program, and when the program counter value does not match with any one of the plurality of break points, set the program counter value as the execution start address to the first register, set to the second register an address that is larger than the program counter value and is minimum among the plurality of break points as the minimum address, and resume the execution of the target program from the execution start address.

According to the one embodiment, it is possible to simplify circuit configurations of a debug system and a semiconductor device.

BRIEF DESCRIPTION OF THE DRAWINGS

The above and other aspects, advantages and features will be more apparent from the following description of certain embodiments taken in conjunction with the accompanying drawings, in which:

FIG. 4 is a view illustrating a configuration example of the HW break point setting table according to the first embodiment;

FIG. 7 is a view illustrating an address setting example of a target program according to an execution example (1) of the first embodiment;

FIG. 8 is a view illustrating an address setting example of a target program according to an execution example (2) of the first embodiment;

FIG. 9 is a view illustrating an address setting example of the target program according to an execution example (3) of the first embodiment;

FIG. 10 is a view illustrating an address setting example of the target program according to an execution example (4) according to the first embodiment;

FIG. 12 is a view illustrating a configuration example of a HW break point setting table according to a third embodiment;

DETAILED DESCRIPTION

Figure 1:
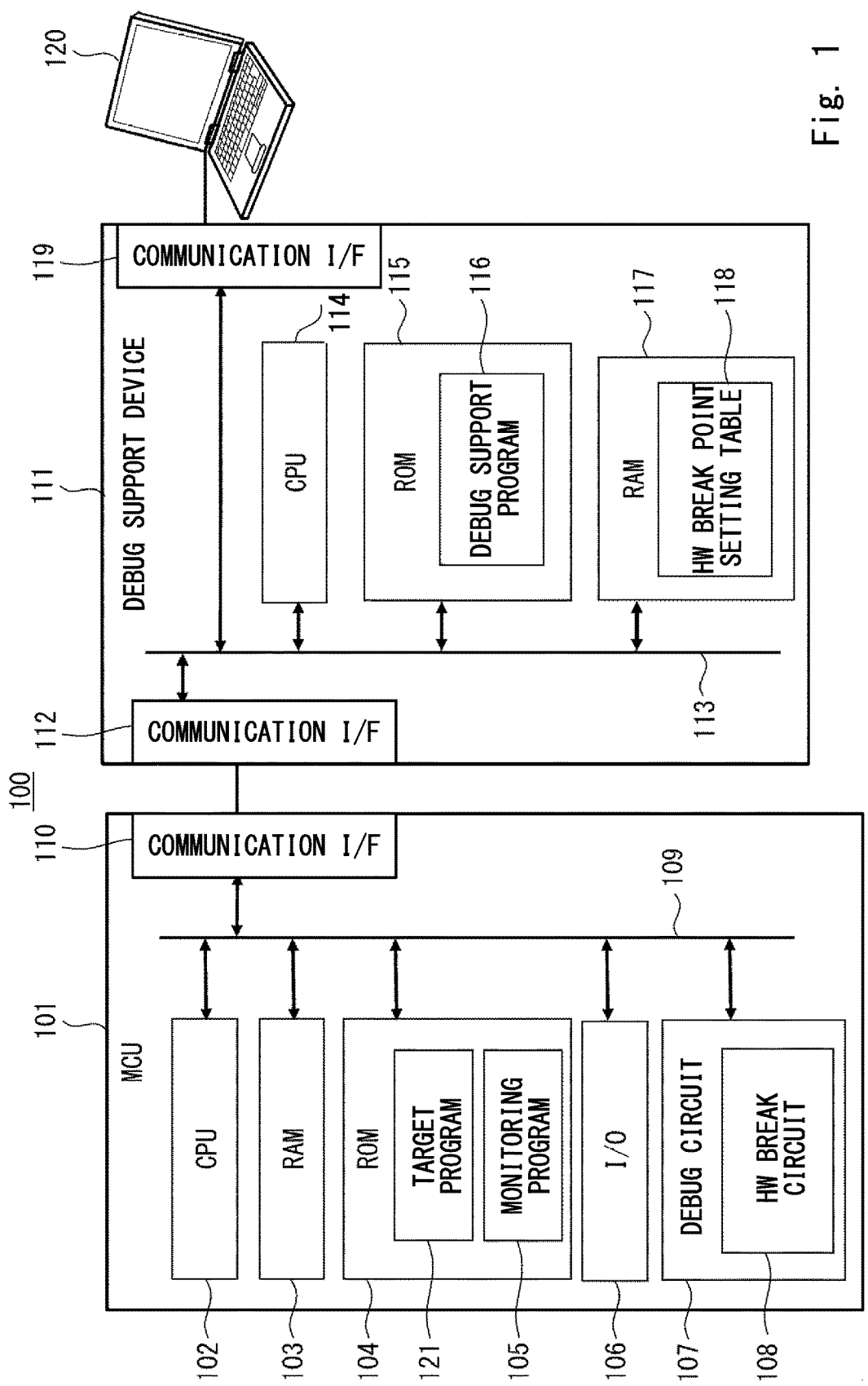
FIG. 1 is a block diagram illustrating an entire configuration of a debug system according to a first embodiment.

Specific embodiments to which means for solving the above problem is applied will be described in detail with reference to the drawings. The same components will be assigned the same reference numerals in each drawing, and overlapping description will be omitted when necessary to clarify the description.

The following embodiments will be divided into a plurality of sections or embodiments when necessary to describe. However, a plurality of sections or embodiments are not irrelevant to each other unless specified in particular, and have a relationship that one of a plurality of sections or embodiments is part of the other, all modifications, application examples, detailed description or supplementary description. Further, in the following embodiments, a mention to the number of elements (including quantities, numerical values, amounts and ranges) does not limit the number to a specific number except that the number is explicitly indicated in particular or is fundamentally and obviously limited to the specific number, and may be the specific number or more or less.

In the following embodiments, components (including operation steps) are not necessarily indispensable except that the components are explicitly indicated in particularly or are fundamentally and obviously indispensable. Similarly, in the following embodiments, mentions to shapes of the components and positional relationships include substantially approximate or similar shapes except that the shapes and the positional relationships are explicitly indicated in particular or are not obviously true. This applies to the numbers (quantities, numerical values, amounts and ranges), too, likewise.

A background which reaches the following embodiments will be described. When a program is debugged, various types of debug processing of stopping execution of a specific address and checking variables and register values is frequently performed. To stop execution of a specific address, a pre-execution PC break function is used.

The pre-execution PC break function includes two types of a HW (HardWare) break function of using a debug circuit (OCD (On Chip Debug) circuit) built in a MCU (Micro Control Unit), and a SW (SoftWare) break function of rewriting a break point position command to a BRK command. The respective break functions include the following characteristics.

The HW break function does not rewrite a command and therefore does not take a time for setting, and does not rewrite a command and therefore does not influence an operational life of a flash memory. On the contrary, the number of settable break points depends on an OCD circuit scale built in the MCU, and therefore is small.

The number of settable break points does not depend on the OCD circuit of the MCU, and therefore the SW break function has a large number of settable break points. On the contrary, the SW break function rewrites a command and therefore takes a time for setting, and has an influence on the operational life of the flash memory.

A mechanism which can set multiple pre-execution PC breaks point without rewriting command is disclosed in Japanese Unexamined Patent Application Publication No. H06-103110. However, Japanese Unexamined Patent Application Publication No. H06-103110 needs an independent branch trace mechanism in addition to a break point detection mechanism. Therefore, a processing structure becomes complicated. Hence, the following embodiments reduce a branch trace mechanism, and realize program stop at a break point and program stop at a branch by performing integrated hardware processing. Further, it is possible to reduce a debug support program scale, too, and consequently enhance reliability.

First Embodiment

FIG. 1 is a block diagram illustrating an entire configuration of a debug system 100 according to the first embodiment. The debug system 100 includes a MCU 101, a debug support device 111 and a computer terminal 120.

The MCU 101 includes a CPU (Central Processing Unit) 102, a RAM (Random Access Memory) 103, a ROM (Read Only Memory) 104, an I/O (Input/Output) 106, a debug circuit 107 and a communication I/F (Inter/Face) 110 which are connected via a bus 109. The ROM 104 stores a monitoring program 105 and a target program 121. The monitoring program 105 is a computer program in which processing of performing various setting processing to the debug circuit 107 according to an instruction from the debug support device 111 is implemented. The target program 121 is a debug target user program. The CPU 102 reads and executes programs stored in the RAM 103 and the ROM 104.

The debug circuit 107 includes a HW break circuit 108. The HW break circuit 108 is a circuit which interrupts an operation of the target program 121 when a program counter value of the CPU 102 in a case where the target program 121 is executed indicates an outside of a specified range. A specific configuration of the HW break circuit 108 will be described below. The communication I/F 110 is an interface which communicates with each component inside the MCU 101 via the bus 109, and communicates with the debug support device 111 via the communication I/F 112.

Figure 2:
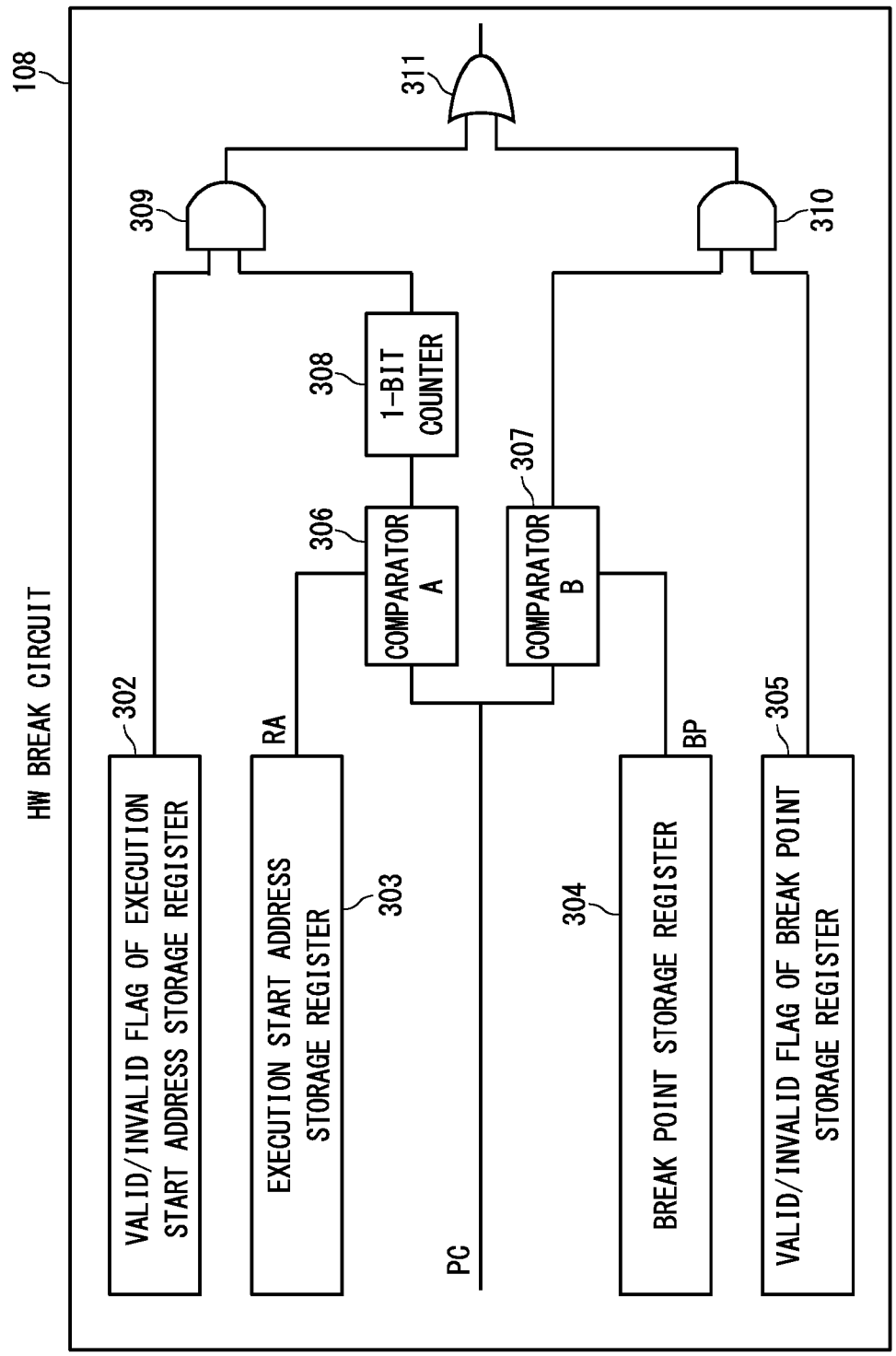
FIG. 2 is a block diagram illustrating a configuration of the HW break circuit according to the first embodiment.

FIG. 2 is a block diagram illustrating a configuration of the HW break circuit 108 according to the first embodiment. The HW break circuit 108 includes valid/invalid flags 302 and 305, an execution start address storage register 303, a break point storage register 304, a comparator A 306, a comparator B 307, a 1-bit counter 308, AND circuits 309 and 310 and an OR circuit 311. The execution start address storage register 303 is a first register which holds a program counter value (execution start address RA) during start of execution or resumption of execution of the target program 121. The break point storage register 304 is a second register which holds a latest address which is larger than an execution start address and is minimum among break points set to the target program 121. In other words, the latest address is an address which is larger than the execution start address and is the closest to the execution start address.

The comparator A 306 is a first comparator which compares the execution start address RA set to (held in) the execution start address storage register 303 and a program counter value PC, and outputs a first comparison result. More specifically, the comparator A 306 outputs 1 as the first comparison result when the program counter value PC is the execution start address RA or less, and outputs 0 as the first comparison result when the program counter value PC is larger than the execution start address RA.

The 1-bit counter 308 counts one bit to an internal counter value when the first comparison result shows that the program counter value PC is the execution start address RA or less, and outputs an overflow signal when the counter value overflows from the one-bit. In other words, the 1-bit counter 308 is an example of a counter circuit, and outputs a condition establishment signal when a condition that the first comparison result shows that the program counter value PC is the execution start address RA or less is established two times. More specifically, the 1-bit counter 308 adds 1 to the counter value when an output of the comparator A 306 is 1. Further, the 1-bit counter 308 outputs 1 when the counter value exceeds 1, and outputs 0 in the other cases. In this regard, a detailed configuration of the 1-bit counter 308 will be described below.

The valid/invalid flag 302 is a flag which indicates whether the execution start address storage register 303 is valid or invalid. More specifically, when the execution start address storage register 303 is valid, the flag is set to 1, and when the execution start address storage register 303 is invalid, the flag is set to 0.

The AND circuit 309 outputs a value obtained by calculating an AND of the value of the valid/invalid flag 302 of the execution start address storage register 303, and an output value of the 1-bit counter 308.

The comparator B 307 is a second comparator which compares a break point BP set to (held in) the break point storage register 304 and the program counter value PC, and outputs a second comparison result. More specifically, the comparator B 307 outputs 1 as the second comparison result when the program counter value PC is the breakpoint BP or more, and outputs 0 as the second comparison result when the program counter value PC is smaller than the break point BP.

The valid/invalid flag 305 is a flag which indicates whether the break point storage register 304 is valid or invalid. More specifically, when the break point storage register 304 is valid, the flag is set to 1, and when the break point storage register 304 is invalid, the flag is set to 0.

The AND circuit 310 outputs a value obtained by calculating an AND of a value of the valid/invalid flag 305 of the break point storage register 304 and an output value of the comparator B 307.

The OR circuit 311 outputs a value obtained by calculating an OR of the AND circuit 309 and the AND circuit 310. The HW break circuit 108 interrupts execution of the target program 121 when an output of the OR circuit 311 is 1.

Figure 3:
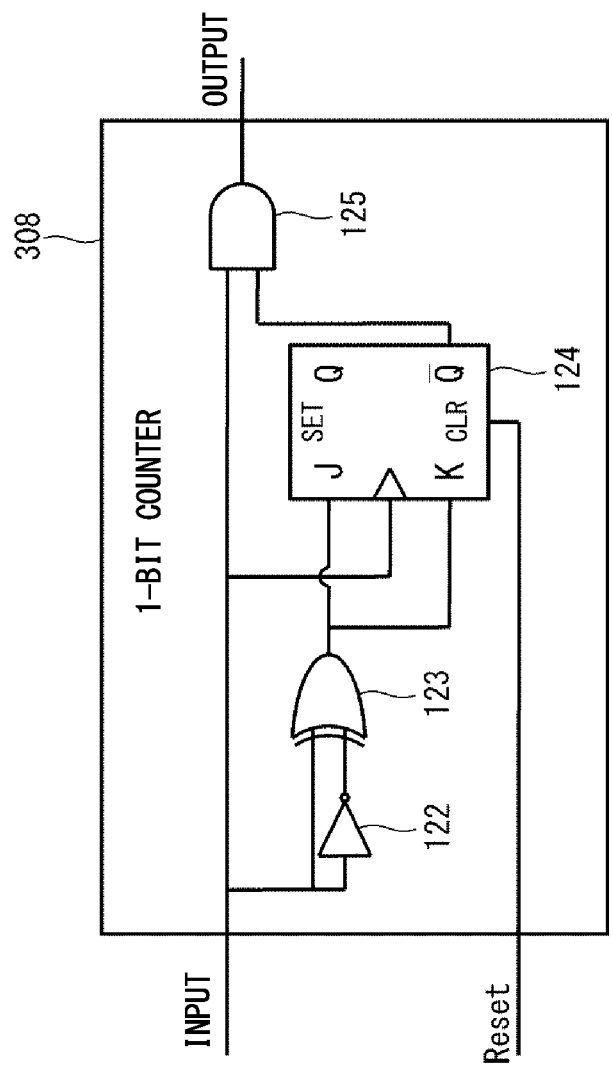
FIG. 3 is a block diagram illustrating a configuration of a 1-bit counter according to the first embodiment.

FIG. 3 is a block diagram illustrating a configuration of the 1-bit counter 308 according to the first embodiment. The 1-bit counter 308 includes a NOT circuit 122, an XOR circuit 123, a JK flip flop 124 and an AND circuit 125.

The 1-bit counter 308 receives an input of a signal from the comparator A 306 and outputs a signal to the AND circuit 309. The 1-bit counter 308 receives an input of a Reset signal immediately before start of execution or resumption of execution of the target program 121. When receiving an input of the Reset signal, the JK flip flop 124 is initialized, and outputs 1 to the AND circuit 125. In this regard, immediately before start of execution or resumption of execution of the target program 121, the output of the comparator A 306 is 0, and therefore an output of the AND circuit 125 is 0.

A J terminal and a K terminal of the JK flip flop 124 are connected to the XOR circuit 123. Since one of two input terminals of the XOR circuit 123 is connected to the NOT circuit 122, values of the two input terminals are always different values. Therefore the output of the XOR circuit 123 is always 1. When both of the J terminal and the K terminal of the JK flip flop 124 take 1 at all times, every time a condition of the comparator A 306 is established, a value of the JK flip flop 124 is inverted. When the condition of the comparator A 306 is established for the first time, an output from the JK flip flop 124 to the AND circuit 125 is 0, and an output of the 1-bit counter 308 is 0. When the condition of the comparator A 306 is established for the second time, an output from the JK flip flop 124 to the AND circuit 125 is 1. Inputs to the AND circuit 125 from the comparator A 306 and the JK flip flop 124 are 1, and therefore the value of the 1-bit counter 308 is 1. Hence, only when the condition of the comparator A 306 is established for the second time, an output of the 1-bit counter 308 is 1.

The description continues back to FIG. 1. The debug support device 111 includes a communication I/F 112, a CPU 114, a ROM 115, a RAM 117 and a communication I/F 119 which are connected via a bus 113. The ROM 115 stores a debug support program 116. The debug support program 116 is a computer program in which debug support processing according to the present embodiment is implemented. The debug support program 116 is an aggregation of various routines for debug.

The debug support program 116 includes a routine (register setting processing) of determining a value set to each flag (valid/invalid flags 302 and 305) of the HW break circuit 108, each register (the execution start address storage register 303 and the break point storage register 304) and the 1-bit counter 308, and includes processing of deciding whether to resume execution or keep interruption of the target program 121 when the HW break circuit 108 interrupts the execution of the target program 121. The debug support program 116 transmits various commands to the MCU 101 via the communication I/F 112.

The monitoring program 105 includes a routine of analyzing a command transmitted from the debug support program 116, and setting the value to each flag of the HW break circuit 108, each register and the 1-bit counter 308.

The RAM 117 stores a HW break point setting table 118. The HW break point setting table 118 is information for storing a pre-execution PC break point set by a user. In this regard, in the HW break point setting table 118, breakpoints are arranged in order of smaller addresses. FIG. 4 is a view illustrating a configuration example of the HW break point setting table 118 according to the first embodiment. For example, a relationship of BP1<BP2<BP3 is formed.

The CPU 114 reads and executes programs stored in the RAM 117 and the ROM 115. Particularly, the CPU 114 functions as a debug control unit by reading and executing the debug support program 116 stored in the ROM 115. The communication I/F 112 is an interface which communicates with each component inside the debug support device 111 via the bus 113, and communicates with the MCU 101 via the communication I/F 110. The communication I/F 119 is an interface which communicates with each component inside the debug support device 111 via the bus 113, and communicates with the computer terminal 120.

The computer terminal 120 is an information processing apparatus which is operated by the user to debug the target program 121. The computer terminal 120 debugs the target program 121 in the MCU 101 via the debug support device 111, and displays a result.

In this regard, the debug system according to the first embodiment can be expressed as follows. That is, the debug system includes a storage unit which stores a plurality of break points in a target program, a debug control unit which controls debug of the target program, and a break circuit which includes a first register which holds an execution start address of the target program, and a second register which holds an address which is larger than the execution start address and is minimum among a plurality of addresses associated with a plurality of break points. Further, when the program counter value during execution of the target program is the execution start address or less or the minimum address or more, the break circuit interrupts execution of the target program. Furthermore, during interruption of execution of the target program, when the program counter value does not match with any one of a plurality of break points, the debug control unit sets the program counter value as the execution start address to the first register, sets to the second register an address which is larger than the program counter value and is minimum among a plurality of break points as the minimum address, and resumes execution of the target program from the execution start address. Consequently, it is possible to omit a branch trace mechanism according to Japanese Unexamined Patent Application Publication No. H06-103110, and simplify the circuit configuration.

Further, desirably, the break circuit further includes a first comparator which compares the execution start address set to the first register and the program counter value, and outputs a first comparison result, a counter circuit which, when a condition that the first comparison result shows that the program counter value is the execution start address or less is established a plurality of times, outputs a condition establishment signal, a second comparator which compares the minimum address set to the second register and the program counter value, and outputs a second comparison result, and an OR circuit which outputs an interruption signal for interrupting execution of the target program based on the condition establishment signal or the second comparison result. Consequently, when the condition of the first comparator is established for the first time, execution of the target program is not interrupted, and when the condition is established for the second time, the execution of the target program can be interrupted. Consequently, a break point detection mechanism and a branch trace mechanism are separated according to Japanese Unexamined Patent Application Publication No. H06-103110. According to the present embodiment, it is possible to integrally form the break point detection mechanism and the branch trace mechanism, and simplify the circuit configurations. Further, the debug support program does not need to perform processing of deciding a break point or a branch command, and can reduce a program scale and enhance reliability.

Further, the counter circuit may be a 1-bit counter which adds one bit to a counter when the first comparison result shows that the program counter value is the execution start address or less, and outputs the condition establishment signal as 1 every time the counter overflows.

Further, the break circuit further includes a first flag which indicates whether or not the first register is valid or invalid, and a second flag which indicates whether the second register is valid or invalid. Furthermore, the debug control unit sets the first flag to valid when a plurality of break points include an address equal to or less than the program counter value, and sets the second flag to valid when a plurality of break points include an address larger than the program counter value, and the break circuit validates the first comparison result when the first flag is valid, and validates the second comparison result when the second flag is valid. Consequently, it is possible to suppress unnecessary OR calculation for a range to which a break point is not set.

A semiconductor device according to the first embodiment can be expressed as follows. That is, the semiconductor device includes a first register which holds an execution start address of a target program to which a plurality of break points are set, a second register which holds an address which is larger than the execution start address and is minimum among a plurality of break points, a first comparator which compares the execution start address set to the first register and a program counter value, and outputs a first comparison result, a counter circuit which, when a condition that the first comparison result shows that the program counter value is the execution start address or less is established a plurality of times, outputs a condition establishment signal, a second comparator which compares the minimum address set to the second register and the program counter value, and outputs a second comparison result, and an OR circuit which outputs an interruption signal for interrupting execution of the target program based on the condition establishment signal or the second comparison result. Consequently, it is possible to omit the branch trace mechanism of Japanese Unexamined Patent Application Publication No. H06-103110. Further, it is possible to integrate processing of the break point detection mechanism and the branch trace mechanism.

Figure 5:
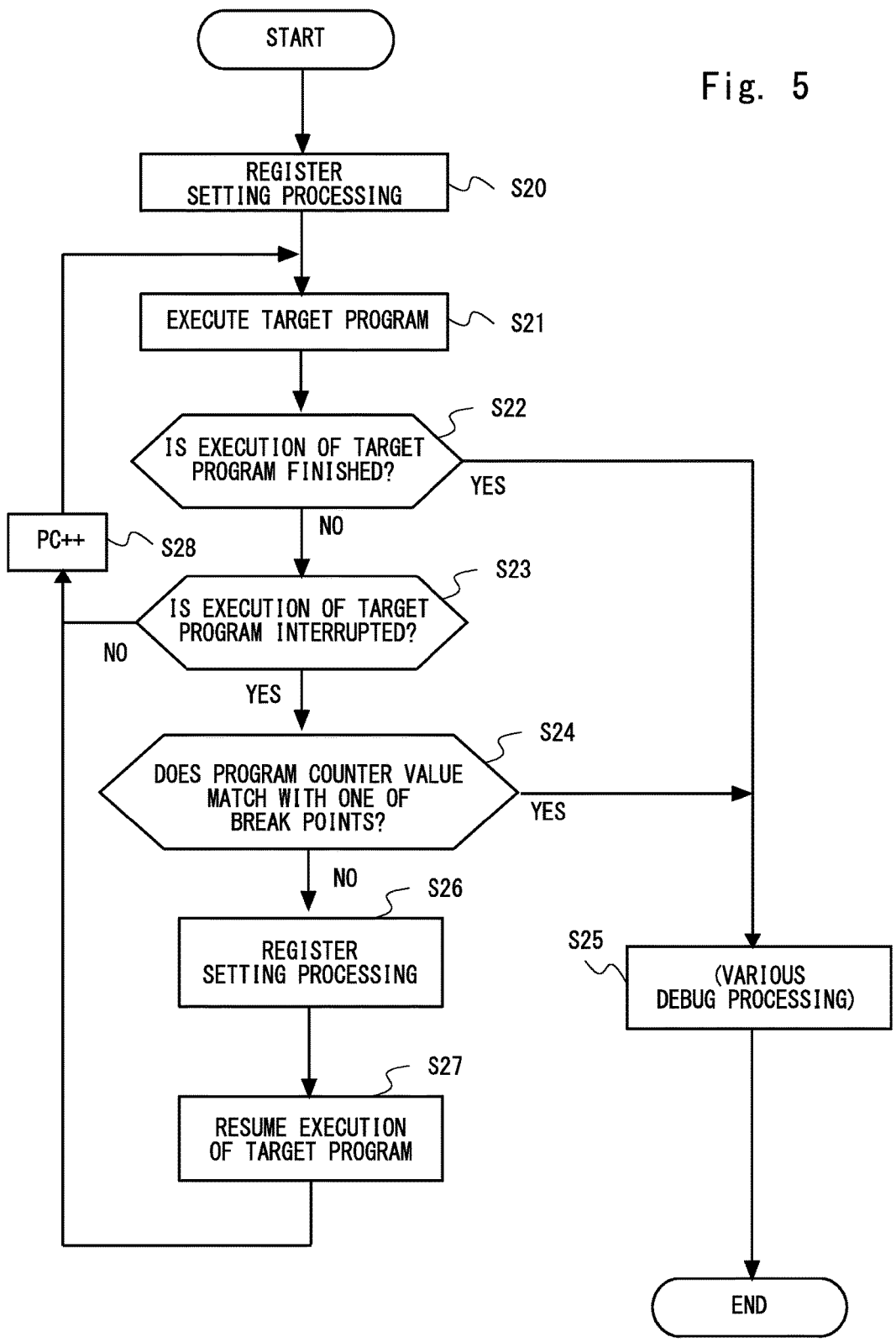
FIG. 5 is a flowchart illustrating a flow of a debug support processing according to the first embodiment.

FIG. 5 is a flowchart illustrating a flow of the debug support processing according to the first embodiment. The computer terminal 120 starts the debug support processing according to a user's operation. Further, the CPU 114 of the debug support device 111 reads and executes the debug support program 116 of the ROM 115, and advances the following processing.

Figure 6:
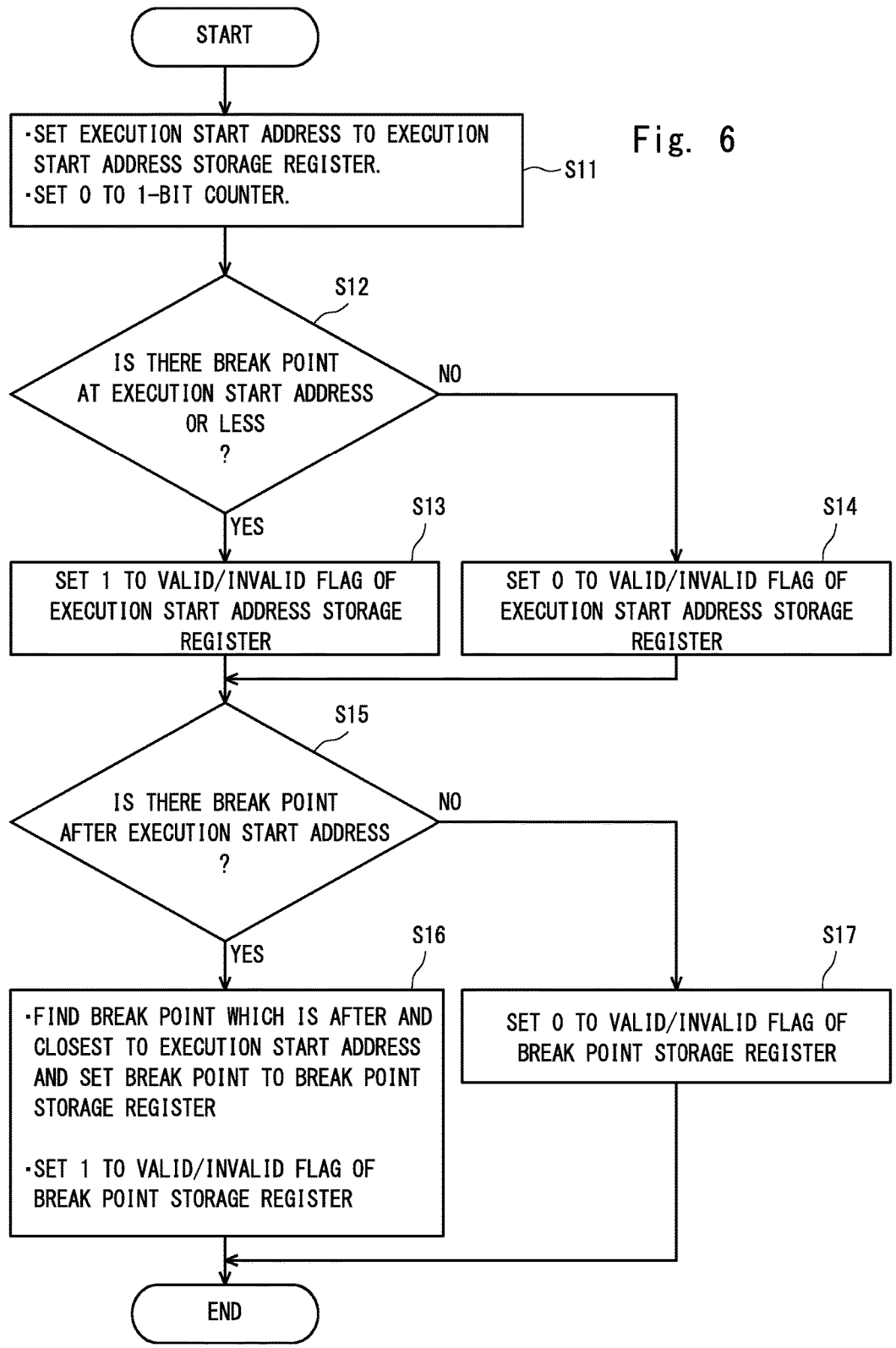
FIG. 6 is a flowchart illustrating a flow of a register setting processing according to the first embodiment.

First, the debug support device 111 performs register setting processing (S20). FIG. 6 is a flowchart illustrating a flow of the register setting processing according to the first embodiment. The debug support device 111 sets an address at start of execution to the execution start address storage register 303 of the HW break circuit 108, and sets 0 to the 1-bit counter 308 (S11). More specifically, the CPU 114 transmits a command to the MCU 101 via the communication I/F 112 and the communication I/F 110. The CPU 102 which reads and executes the monitoring program 105 performs the above setting on the HW break circuit 108. The same applies below, too.

Next, the debug support device 111 decides whether or not a break point is set to the execution start address RA or less (S12). That is, the debug support device 111 decides whether or not the address equal to or less than the execution start address RA is set to the HW break point setting table 118. When the address equal to or less than the execution start address RA is set to the HW break point setting table 118, the debug support device 111 sets 1 to the valid/invalid flag 302 (S13). Meanwhile, in step S12, when the address equal to or less than the execution start address RA is not set to the HW break point setting table 118, the debug support device 111 sets 0 to the valid/invalid flag 302 (S14).

Subsequently, the debug support device 111 decides whether or not a break point is set subsequently to the execution start address RA (S15). That is, the debug support device 111 decides whether or not the address larger than the execution start address RA is set to the HW break point setting table 118. When the address larger than the execution start address RA is set to the HW break point setting table 118, the debug support device 111 sets to the break point storage register 304 a latest address which is larger than the execution start address RA and is the closest to the execution start address RA, and sets 1 to the valid/invalid flag 305 (S16). Meanwhile, in step S15, when the address larger than the execution start address RA is not set to the HW break point setting table 118, the debug support device 111 sets 0 to the valid/invalid flag 305 (S17).

The description continues back to FIG. 5. Subsequently, the debug support device 111 starts executing the target program 121 (S21). In this case, the CPU 102 executes a command of a current program counter value PC of the target program 121. Further, the debug support device 111 decides whether or not execution of the target program 121 has been finished (S22). When, for example, the HW break circuit 108 does not interrupt the execution, i.e., when the execution of the target program 121 is finished, the debug support processing is finished. Meanwhile, when the execution of the target program 121 is not finished, the HW break circuit 108 decides whether or not to interrupt the execution of the target program 121 according to the current program counter value PC. Further, the debug support device 111 decides whether or not the HW break circuit 108 has interrupted the execution of the target program 121 (S23). When the HW break circuit 108 does not interrupt the execution, the CPU 102 counts up the program counter value PC (S28), and the flow returns to step S21.

Meanwhile, in a case where the HW break circuit 108 has interrupted the execution of the target program 121, the debug support device 111 decides whether or not the program counter value PC matches with one of break points (S24). That is, the debug support device 111 refers to the HW break point setting table 118, and decides whether or not a break point equal to the program counter value PC is set. When the program counter value PC matches with one of the break points, the debug support device 111 notifies the computer terminal 120 of this match, and causes the computer terminal 120 to perform various debug processing (S25). That is, the computer terminal 120 refers to and updates a state of the target program 121 according to a user's instruction.

Meanwhile, in step S24, when the program counter value PC does not match with any one of the break points, the debug support device 111 performs register setting processing (S26). In this case, in step S11 in FIG. 6, the debug support device 111 sets the current program counter value PC to the execution start address storage register 303. The same as in FIG. 6 applies to the others. After step S26, the debug support device 111 resumes execution of the target program 121 (S27). The CPU 102 counts up the program counter value PC (S28), and repeats steps S21 to S28 until execution of the target program 121 is finished.

Subsequently, an execution example from start of execution of the target program 121 to interruption at a breakpoint position by the HW break circuit 108 will be described below.

Execution Example (1): Case where Branch Command is not Generated from Program Start to Break Point FIG. 7 is a view illustrating an address setting example of a target program according to the execution example (1) of the first embodiment. In this regard, a BP1 (0001 address), a BP2 (0007 address) and a BP3 (0011 address) are set as break points to the HW break point setting table 118. Further, an execution start address of the target program 121 is a 0003 address. When the debug support processing of the target program 121 is started in this state, following (1-1), (1-2) and (1-3) are executed in order.

(1-1) Setting to HW Break Circuit 108 (S20)

The debug support device 111 sets the execution start address (0003 address) to the execution start address storage register 303 (S11). Further, the debug support device 111 sets 0 to the 1-bit counter 308 (S11).

There is the break point BP1 at the execution start address or below, and therefore the debug support device 111 sets 1 to the valid/invalid flag 302 (S13).

The debug support device 111 sets the BP2 (0007 address) to the break point storage register 304 (S16).

There is the latest break point BP2 after the execution start address, and therefore the debug support device 111 sets 1 to the valid/invalid flag 305 (S16).

(1-2) Execution of Target Program 121 (S21)

Immediately after start of execution, the program counter value PC is 0003, and therefore the condition of the comparator A 306 is established and a counter value of the 1-bit counter 308 is 1. In this regard, the counter value of the 1-bit counter 308 does not overflow, and therefore an output of the 1-bit counter 308 is still 0. Further, in this case, the condition of the comparator B 307 is not established, either. Hence, an output of the OR circuit 311 is also 0, and the HW break circuit 108 does not interrupt execution of the target program 121.

Further, the program counter value PC is counted up (S28), and until the program counter value PC reaches 0007, the conditions of the comparator A 306 and the comparator B 307 are not established. Hence, the output of the OR circuit 311 is also 0, and the HW break circuit 108 does not interrupt execution of the target program 121.

(1-3) Interruption of Execution of Target Program 121

Subsequently, when the program counter value PC reaches 0007, the condition of the comparator B 307 is established, and the output of the OR circuit 311 is 1. Hence, the HW break circuit 108 interrupts execution of the target program 121. Further, the address 0007 indicated by the program counter value PC is set as the BP2 to the HW break point setting table 118 (YES in S24), and therefore the debug support device 111 keeps the interruption. Consequently, the computer terminal 120 performs various debug processing (S25) at the BP2.

Execution Example (2): Case where there is Branch Command from Program Start to Latest Break Point FIG. 8 is a view illustrating an address setting example of a target program according to the execution example (2) of the first embodiment. In this regard, the BP1 (0001 address), the BP2 (0007 address) and the BP3 (0011 address) are set as break points to the HW break point setting table 118. Further, the execution start address of the target program 121 is a 0003 address. Furthermore, at a 0005 address, there is a branch command to 0009 address (A). When the debug support processing of the target program 121 is started in this state, following (2-1), (2-2), (2-3), (2-4) and (2-5) are executed in order.

(2-1) Setting to HW Break Circuit 108 (S20)

Setting contents is the same as in above (1-1).

(2-2) Execution and Interruption of Target Program 121 (S21)

Immediately after start of execution, the program counter value PC is 0003, and therefore the condition of the comparator A 306 is established, and the counter value of the 1-bit counter 308 is 1. In this regard, the counter value of the 1-bit counter 308 does not overflow, and therefore an output of the 1-bit counter 308 is still 0. Further, in this case, the condition of the comparator B 307 is not established, either. Hence, the output of the OR circuit 311 is also 0, and the HW break circuit 108 does not interrupt execution of the target program 121.

Further, when the program counter value PC is counted up (S28) and reaches 0005, a branch command is executed, and the program counter value PC is 0009 which is a branch destination. Therefore, the condition of the comparator B 307 is established, and the output of the OR circuit 311 is 1. Then, the HW break circuit 108 interrupts execution of the target program 121.

(2-3) Resetting to HW Break Circuit 108 (S26)

In this case, the address 0009 indicated by the program counter value PC is not set to the HW break point setting table 118 (NO in S24). Therefore, the debug support device 111 resets registers and flags to the HW break circuit 108 (S26).

The debug support device 111 sets the execution start address (0009 address) to the execution start address storage register 303 (S11). Further, the debug support device 111 sets 0 to the 1-bit counter 308 (S11).

There is the break point BP2 at the execution start address or less, and therefore the debug support device 111 sets 1 to the valid/invalid flag 302 (S13).

The debug support device 111 sets the BP3 (0011 address) to the break point storage register 304 (S16).

There is the latest break point BP3 after the execution start address, and therefore the debug support device 111 sets 1 to the valid/invalid flag 305 (S16).

(2-4) Resumption of Execution of Target Program 121 (S27)

Immediately after resumption of execution, the program counter value PC is 0009, and therefore the condition of the comparator A 306 is established and the counter value of the 1-bit counter 308 is 1. In this regard, the counter value of the 1-bit counter 308 does not overflow, and therefore the output of the 1-bit counter 308 is still 0. Further, in this case, the condition of the comparator B 307 is not established, either. Hence, the output of the OR circuit 311 is 0, and the HW break circuit 108 does not interrupt execution of the target program 121.

Further, until the program counter value PC is counted up (S28) and reaches 0011, the conditions of the comparator 306 and the comparator B 307 are not established. Hence, the output of the OR circuit 311 is also 0, and the HW break circuit 108 does not interrupt execution of the target program 121.

(2-5) Interruption of Execution of Target Program 121

Subsequently, when the program counter value PC reaches 0011, the condition of the comparator B 307 is established, and the output of the OR circuit 311 is 1. Hence, the HW break circuit 108 interrupts execution of the target program 121. Further, the address 0011 indicated by the program counter value PC is set as the BP3 to the HW break point setting table 118 (YES in S24), and the debug support device 111 keeps the interruption. Consequently, the computer terminal 120 can perform various debug processing (S25) at the BP3.

Execution Example (3): Case where there is Branch Command from Program Start to Latest Break Point, and Branch Destination is Outside Range FIG. 9 is a view illustrating an address setting example of the target program according to the execution example (3) of the first embodiment. In this regard, the BP1 (0001 address), the BP2 (0007 address) and the BP3 (0011 address) are set as break points to the HW break point setting table 118. Further, the execution start address of the target program 121 is the 0003 address. Furthermore, at the 0005 address, there is a branch command to the 0000 address (B). When the debug support processing of the target program 121 is started in this state, following (3-1), (3-2), (3-3), (3-4) and (3-5) are executed in order.

(3-1) Setting to HW Break Circuit 108 (S20)

The setting contents is the same as in above (1-1).

(3-2) Execution and Interruption of Target Program 121 (S21)

Immediately after start of execution, the program counter value PC is 0003, and therefore the condition of the comparator A 306 is established and the counter value of the 1-bit counter 308 is 1. In this regard, the counter value of the 1-bit counter 308 does not overflow, and therefore the output of the 1-bit counter 308 is still 0. Further, in this case, the condition of the comparator B 307 is not established, either. Hence, the output of the OR circuit 311 is 0, and the HW break circuit 108 does not interrupt execution of the target program 121.

Further, when the program counter value PC is counted up (S28) and reaches 0005, the branch execution is executed, and the program counter value PC is 0000 which is a branch destination. Hence, the condition of the comparator A 306 is established and the counter value of the 1-bit counter 308 overflows, and therefore the output of the 1-bit counter 308 is 1. Hence, the output of the OR circuit 311 is 1, and the HW break circuit 108 interrupts execution of the target program 121.

(3-3) Resetting to HW Break Circuit 108 (S26)

In this case, the address 0000 indicated by the program counter value PC is not set to the HW break point setting table 118 (NO in S24). Therefore, the debug support device 111 resets registers and flags to the HW break circuit 108 (S26).

The debug support device 111 sets the execution start address (0000 address) to the execution start address storage register 303 (S11). Further, the debug support device 111 sets 0 to the 1-bit counter 308 (S11).

There is no breakpoint at the execution start address or less, and therefore the debug support device 111 sets 0 to the valid/invalid flag 302 (S14).

The debug support device 111 sets the BP1 (0001 address) to the break point storage register 304 (S16).

There is the latest breakpoint BP1 after the execution start address, and therefore the debug support device 111 sets 1 to the valid/invalid flag 305 (S16).

(3-4) Resumption of Execution of Target Program 121 (S27)

Immediately after resumption of execution, the program counter value PC is 0000, and therefore the condition of the comparator A 306 is established and the counter value of the 1-bit counter 308 is 1. In this regard, the counter value of the 1-bit counter 308 does not overflow, and therefore the output of the 1-bit counter 308 is still 0. Further, in this case, the condition of the comparator B 307 is not established, either. Hence, the output of the OR circuit 311 is 0, and the HW break circuit 108 does not interrupt execution of the target program 121.

(3-5) Interruption of Execution of Target Program 121

Subsequently, when the program counter value PC reaches 0001, the condition of the comparator B 307 is established, and the output of the OR circuit 311 is 1. Hence, the HW break circuit 108 interrupts execution of the target program 121. Further, the address 0001 indicated by the program counter value PC is set as the BP1 to the HW break point setting table 118 (YES in S24), and therefore the debug support device 111 keeps the interruption. Consequently, the computer terminal 120 can perform various debug processing (S25) at the BP1.

Execution Example (4): Case where there is Branch Command from Program Start to Latest Break Point, and Branch Destination is Program Start Position FIG. 10 is a view illustrating an address setting example of the target program according to the execution example (4) according to the first embodiment. In this regard, the BP1 (0003 address), the BP2 (0007 address) and the BP3 (0011 address) are set as break points to the HW break point setting table 118. Further, the execution start address of the target program 121 is the 0003 address. Furthermore, at the 0005 address, there is a branch command to the 0003 address (C). When the debug support processing of the target program 121 is started in this state, following (4-1), (4-2) and (4-3) are executed in order.

(4-1) Setting to HW Break Circuit 108 (S20)

The setting contents is the same as in above (1-1).

(4-2) Execution and Interruption of Target Program 121 (S21)

Immediately after start of execution, the program counter value PC is 0003, and therefore the condition of the comparator A 306 is established and the counter value of the 1-bit counter 308 is 1. In this regard, the counter value of the 1-bit counter 308 does not overflow, and therefore the output of the 1-bit counter 308 is still 0. Further, in this case, the condition of the comparator B 307 is not established, either.

Hence, the output of the OR circuit 311 is also 0, and the HW break circuit 108 does not interrupt execution of the target program 121.

Further, when the program counter value PC is counted up (S28) and reaches 0005, the branch command is executed, and the program counter value PC is 0003 which is the branch destination. Hence, the condition of the comparator B 307 is established, and the output of the OR circuit 311 is 1. Hence, the HW break circuit 108 interrupts execution of the target program 121.

Further, the address 0003 indicated by the program counter value PC is set as the BP1 to the HW break point setting table 118 (YES in S24), and therefore the debug support device 111 keeps the interruption. Consequently, the computer terminal 120 can perform various debug processing (S25) at the BP1.

Second Embodiment

The second embodiment is a modified example of the above first embodiment. A counter circuit according to the second embodiment outputs the condition establishment signal when the first flag is valid. In other words, a 1-bit counter according to the second embodiment performs the counting and outputs the overflow signal when the first flag is valid.

Figure 11:
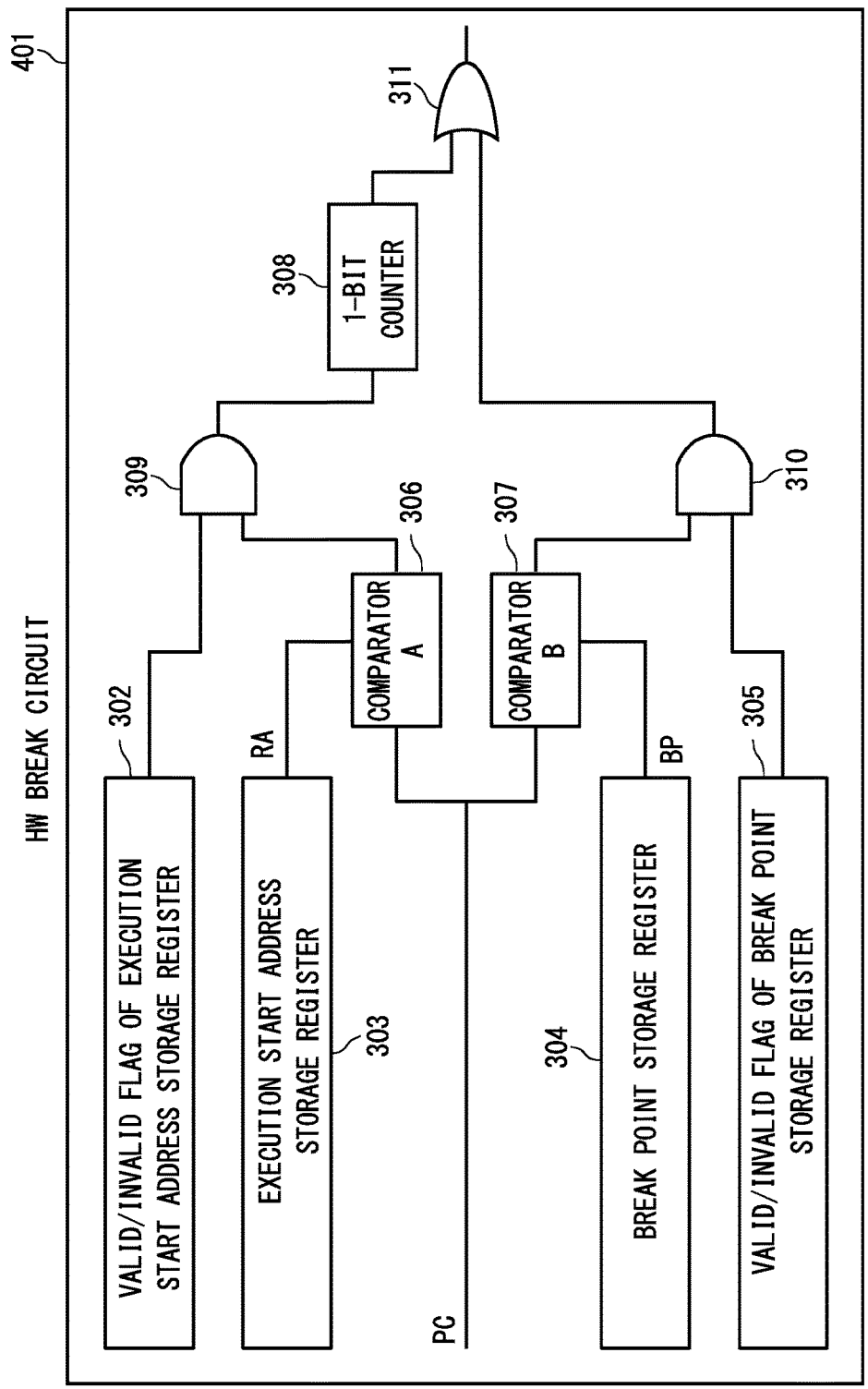
FIG. 11 is a block diagram illustrating a configuration of a HW break circuit according to a second embodiment.

FIG. 11 is a block diagram illustrating a configuration of a HW break circuit 401 according to the second embodiment. The HW break circuit 401 is a circuit which switches positions of a 1-bit counter 308 and an AND circuit 309 compared to a HW break circuit 108 in FIG. 2 in the first embodiment. Further, the other components are the same as those in the HW break circuit 108.

In the HW break circuit 108 in FIG. 2, when an output of a comparator A 306 is 1, the 1-bit counter 308 performs an operation of adding 1 to a counter value irrespectively of a value of a valid/invalid flag 302. Hence, unnecessary power is consumed in this regard. Meanwhile, in the HW break circuit 401 according to the second embodiment, when a value of the valid/invalid flag 302 is 0, the AND circuit 309 outputs 0. In this case, the 1-bit counter 308 does not perform an operation of adding 1 to a counter value. Consequently, it is possible to suppress power consumption compared to the HW break circuit 108, and provide the same effect.

Third Embodiment

The third embodiment is an improvement example of the above first or second embodiment. A storage unit according to the third embodiment further stores a matched count which is the number of times that the program counter value matches with each of the plurality of break points, and an upper limit count which indicates an upper limit count of matched count in association with each of a plurality of break points. Further, the debug control unit adds the matched count associated with a matched break point when the program counter value matches with each of a plurality of break points, and keeps interrupting execution of the target program when the matched count after the addition reaches the upper limit count. This is useful in a case where, when, for example, a break point is set to an address in loop processing, it is not necessary to interrupt execution of a target program 121 every time the program counter value reaches the address, and it is sufficient to interrupt execution once in several times and check a state. Consequently, it is possible to flexibly debug each break point.

FIG. 12 is a view illustrating a configuration example of a HW break point setting table 501 according to the third embodiment. The HW break point setting table 501 includes a breakpoint setting region 502, a pass count region 503 and an establishment count storage region 504. The breakpoint setting region 502 is a region which sets an address of a break point. The pass count region 503 is a region which sets a pass counter which is necessary to interrupt execution of the target program 121 and indicates the number of times that the program counter value reaches each break point (a condition is established). The establishment count storage region 504 is a region which stores the number of times of establishment indicating the number of times that a condition that a program counter value PC reaches each break point is established.

Figure 13:
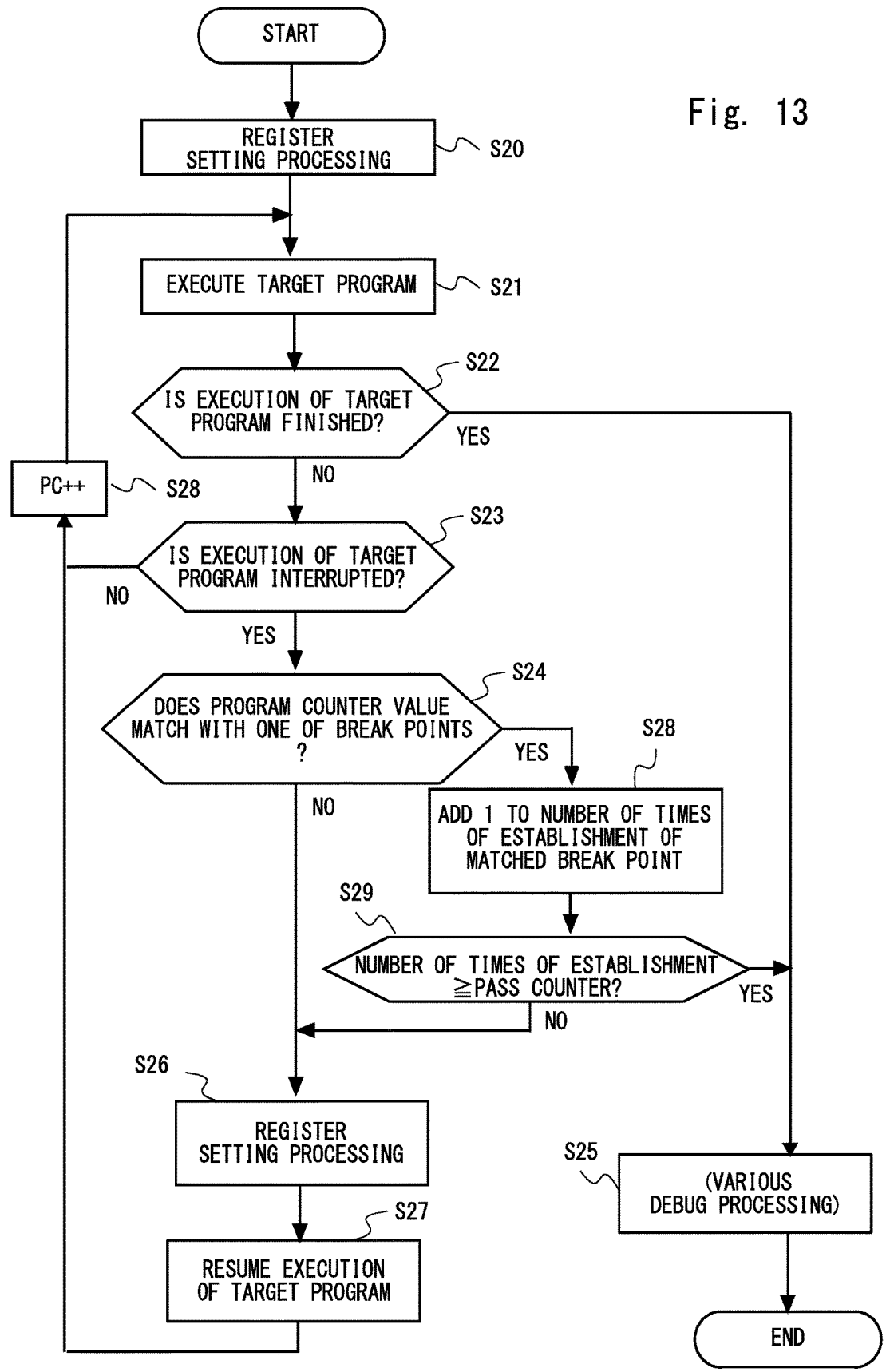
FIG. 13 is a flowchart illustrating a flow of the debug support processing according to the third embodiment.

FIG. 13 is a flowchart illustrating a flow of the debug support processing according to the third embodiment. First, during register setting processing in step S20, a value of the establishment count storage region 504 of each break point is set to 0. Further, in a case of YES in step S24, a debug support device 111 adds 1 to the number of times of establishment of the matched break point (S28). Subsequently, the debug support device 111 decides whether or not the number of times of establishment is a pass counter or more (S29). When the number of times of establishment is the pass counter or more, the flow moves to step S25. When the number of times of establishment is less than the pass counter, the flow moves to step S27.

Fourth Embodiment

The fourth embodiment is an improvement example of the above first to third embodiments. In the fourth embodiment, the numbers of bits of the first and second registers are larger than the number of bits of the program counter value. Further, the first comparator performs signed comparison between the execution start address set to the first register and the program counter value. The second comparator performs unsigned comparison between the minimum address set to the second register, and the program counter value. Consequently, it is possible to omit valid/invalid flags 302 and 305, and AND circuits 309 and 310 of a HW break circuit according to the first to third embodiments. Consequently, it is possible to reduce a circuit scale, and reduce power consumption.

Figure 14:
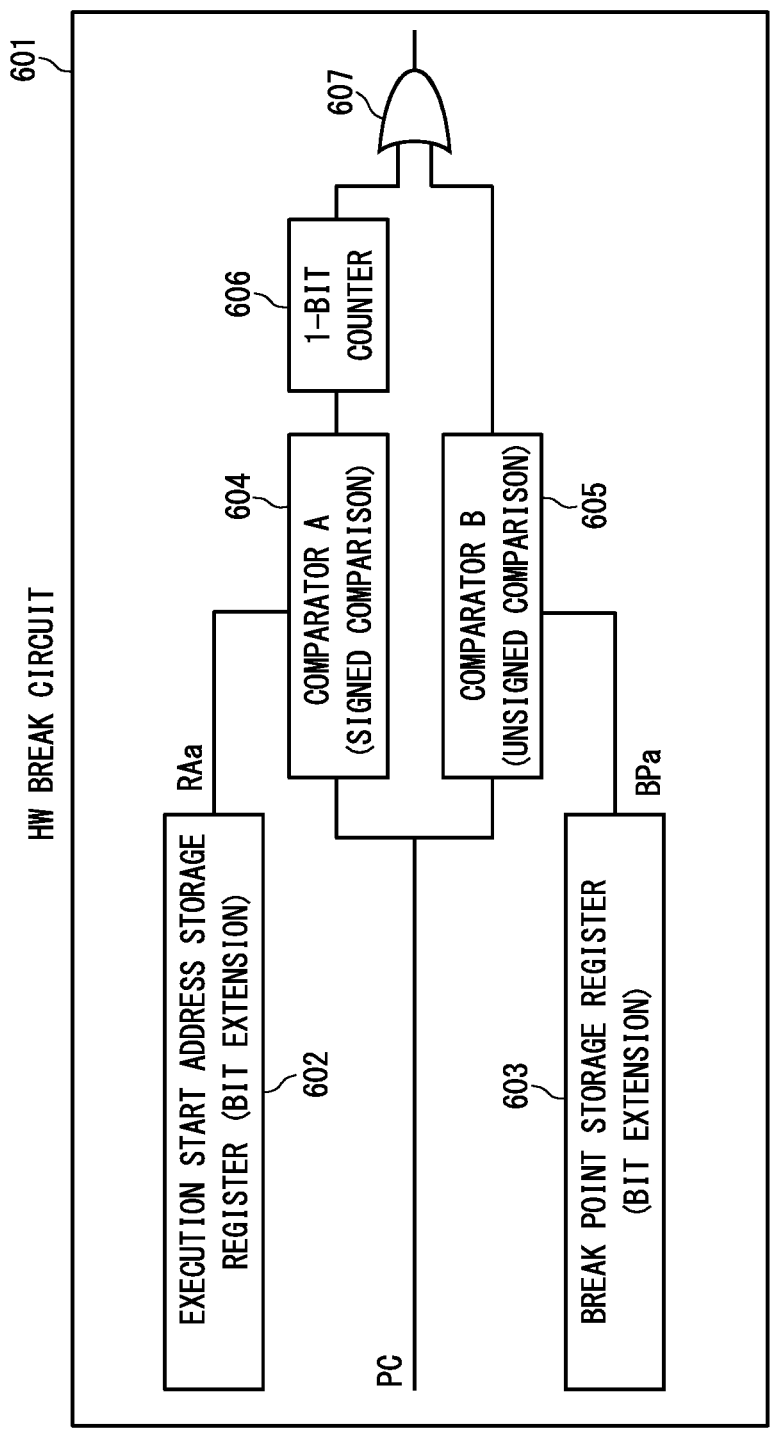
FIG. 14 is a block diagram illustrating a configuration of a HW break circuit according to a fourth embodiment.

FIG. 14 is a block diagram illustrating a configuration of a HW break circuit 601 according to the fourth embodiment. The HW break circuit 601 includes an execution start address storage register 602, a break point storage register 603, a comparator A 604, a comparator B 605, a 1-bit counter 606 and an OR circuit 607.

The execution start address storage register 602 is a register which is one bit larger than a program counter value PC, and sets a most significant bit to 0 or 1 and subsequently sets an execution start address. The comparator A 604 performs signed comparison between an execution start address RAa and the program counter value PC, and outputs a comparison result to the 1-bit counter 606. The 1-bit counter 606 is the same as the 1-bit counter 308.

The break point storage register 603 is a register which is one bit larger than the program counter value PC, and sets a most significant bit to 0 or 1 and subsequently sets the latest break point. The comparator B 605 performs signed comparison between a break point BPa and the program counter value PC, and outputs a comparison result to the OR circuit 607. The OR circuit 607 outputs a value obtained by calculating an OR of the 1-bit counter 606 and the comparator B 605. The HW break circuit 601 interrupts execution of a target program 121 when an output of the OR circuit 607 is 1.

Figure 15:
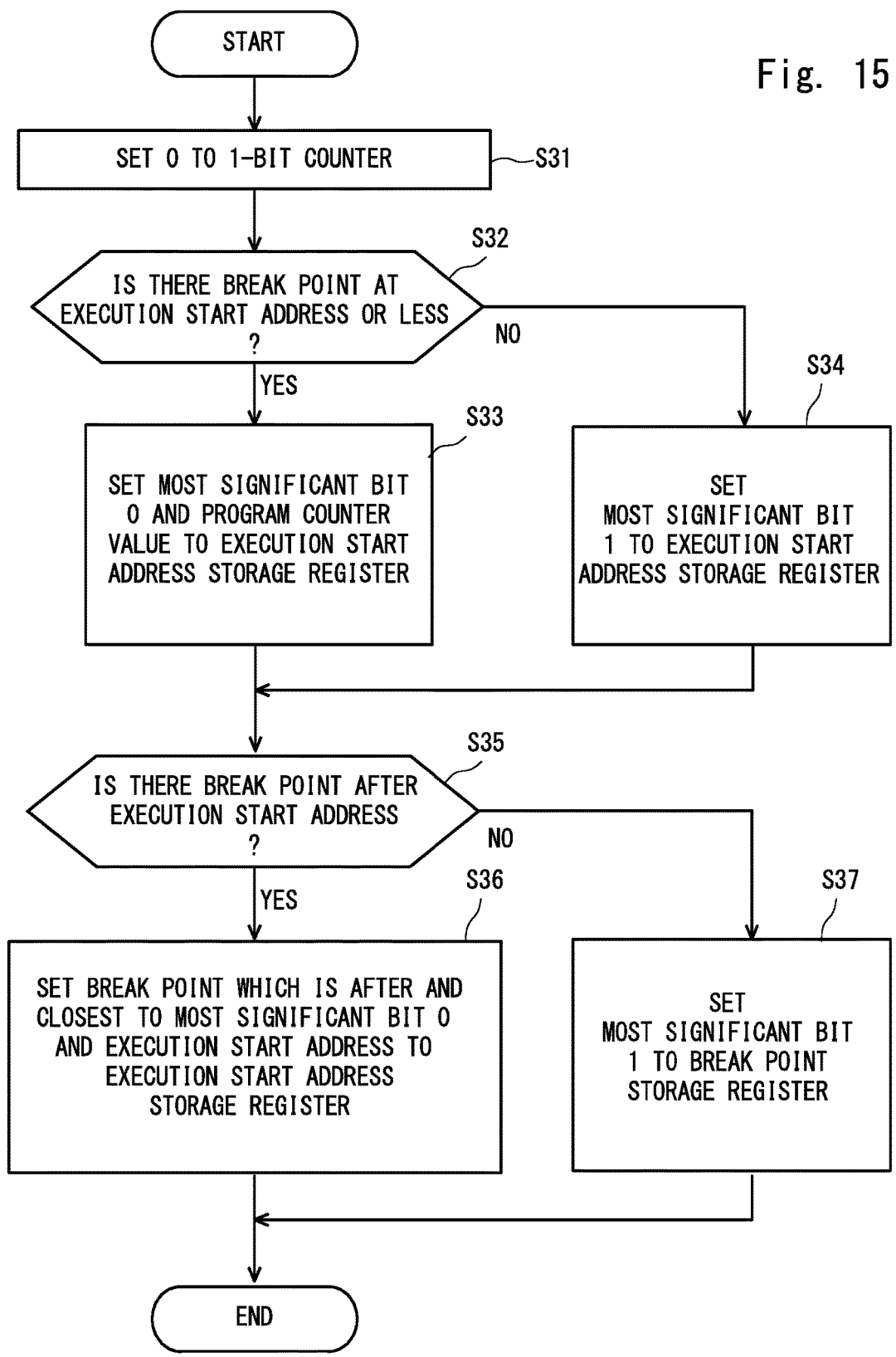
FIG. 15 is a flowchart illustrating a flow of the register setting processing according to the fourth embodiment.

FIG. 15 is a flowchart illustrating a flow of the register setting processing according to the fourth embodiment. First, a debug support device 111 sets 0 to the 1-bit counter 606 (S31). Next, the debug support device 111 decides whether or not a break point is set at an execution start address RA or less (S32). When the break point is set at the execution start address RA or less, the debug support device 111 sets the most significant bit 0 and the program counter value PC to the execution start address storage register 602 (S33). Meanwhile, in step S32, when the break point is not set at the execution start address RA or less, the debug support device 111 sets 1 to the most significant bit of the execution start address storage register 602 (S34).

Subsequently, the debug support device 111 decides whether or not the break point is set after the execution start address RA (S35). When the break point is set after the execution start address RA, the debug support device 111 sets to the break point storage register 603 a latest address which is larger than the most significant bit 0 and the execution start address RA, and is closest to the execution start address RA (S36). Meanwhile, in step S35, when the break point is not set after the execution start address RA, the debug support device 111 sets 1 to the most significant bit of the break point storage register 603 (S37).

By setting 1 to the most significant bit of the execution start address storage register 602 as in step S34, the comparator A 604 which performs the signed comparison handles the value of the execution start address RAa as a negative number. Hence, the execution start address RAa is smaller than the program counter value PC at all times, and an output of the comparator A 604 is 0 at all times. That is, it is possible to provide the same effect as that in a case where 0 is set to the valid/invalid flag 302 in FIG. 2.

Further, in step S37, by setting 1 to the most significant bit of the break point storage register 603, the break point BPa takes a larger value than the program counter value PC at all times in the comparator B 605 which performs unsigned comparison. Hence, the output of the comparator B 605 is 0 at all times. That is, it is possible to provide the same effect as that in a case where 0 is set to the valid/invalid flag 305 in FIG. 2.

Fifth Embodiment

The fifth embodiment is a modified example of the above first to fourth embodiments.

Figure 16:
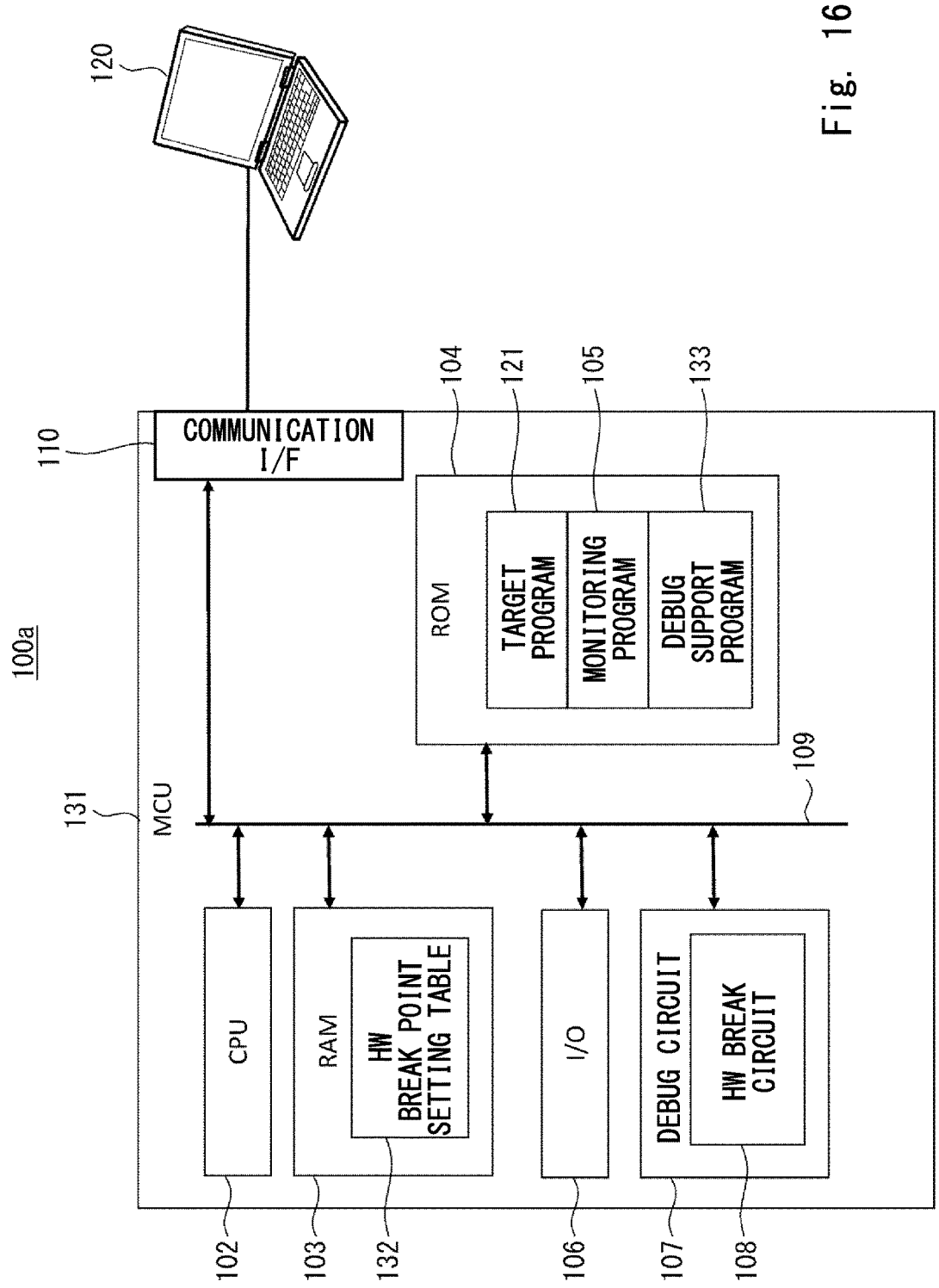
FIG. 16 is a block diagram illustrating an entire configuration of a debug system according to a fifth embodiment.

FIG. 16 is a block diagram illustrating an entire configuration of a debug system 100*a* according to the fifth embodiment. The debug system 100*a* includes a MCU 131 and a computer terminal 120. The MCU 131 includes a CPU 102, a RAM 103, a ROM 104, an I/O 106 a debug circuit 107 and a communication I/F 110 which are connected via a bus 109. In this regard, the same components as those in FIG. 1 will be assigned the same reference numerals, and will not be described in detail.

The RAM 103 stores a HW break point setting table 132. The HW break point setting table 132 is set by the computer terminal 120 via the communication I/F 110 and the bus 109. The ROM 104 stores a monitoring program 105, a debug support program 133 and a target program 121. The debug support program 133 is activated by the computer terminal 120 via the communication I/F 110 and the bus 109. In this case, the CPU 102 reads and executes the debug support program 133 stored in the ROM 104 to function as a debug control unit.

Thus, by arranging the debug support program 133 in the RAM 103 built in the MCU 131 and arranging the HW break point setting table 132 in the RAM 103, it is possible to realize the same effect as those in the first to fourth embodiments without using a debug support device 111. Further, the debug support device 111 is not used in FIG. 16, so that it is possible to construct a debug system at low cost compared to FIG. 1.

Other Embodiments

In this regard, the above first to fourth embodiments do not need a region which stores a debug support program and a HW break point in a ROM or a RAM built in a MCU. Consequently, it is possible to provide an effect that it is possible to sufficiently allocate a memory region used for a debug target program.

Further, the present invention has been described as a hardware configuration in the above embodiments. However, the present invention is not limited to this. The present invention can also realize arbitrary processing by causing a processor such as a CPU (Central Processing Unit) to execute a computer program.

In the above embodiments, the program can be stored by using various types of non-transitory computer readable media, and be supplied to a computer. The non-transitory computer readable media include various types of tangible storage media. The non-transitory computer readable media include, for example, magnetic recording media (e.g., flexible disks, magnetic tapes and hard disk drives), magnetooptical recording media (e.g., optical magnetic disks), CD-ROMs (Read Only Memory), CD-Rs, CD-R/Ws and semiconductor memories (e.g., mask ROMs, PROMs (Programmable ROM), EPROMs (Erasable PROM), flash ROMs and RAMS (RandomAccess Memory)). Further, the programs may be supplied to the computers via various types of transitory computer readable media. The transitory computer readable media include, for example, electrical signals, optical signals and electromagnetic waves. The transitory computer readable media can supply the programs to the computers via wired communication channels such as electrical cables or optical fibers or wireless communication channels.

The invention invented by the inventor of the present invention has been specifically described above based on the embodiments. However, the present invention is not limited to the above-described embodiments, and can be variously changed without departing from the scope of the invention.

The first, second, third, fourth and fifth embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A debug system comprising:
   a storage unit configured to store a plurality of break points in a target program;

a debug control unit configured to control debug of the target program; and a break circuit including a first register configured to hold an execution start address of the target program, and a second register configured to hold an address that is larger than the execution start address and is minimum address among the plurality of addresses associated with the plurality of break points, wherein the break circuit is configured to, when a program counter value during execution of the target program is the execution start address or less or the minimum address or more, interrupt the execution of the target program, and the debug control unit is configured to, during the interruption of the execution of the target program, and when the program counter value does not match with any one of the plurality of break points, set the program counter value as the execution start address to the first register, set to the second register an address that is larger than the program counter value and is minimum among the plurality of break points as the minimum address, and resume the execution of the target program from the execution start address.

2. The debug system according to claim 1, wherein the break circuit further includes a first comparator configured to compare the execution start address set to the first register and the program counter value, and output a first comparison result, a counter circuit configured to, when a condition that the first comparison result shows that the program counter value is the execution start address or less is established a plurality of times, output a condition establishment signal, a second comparator configured to compare the minimum address set to the second register and the program counter value, and output a second comparison result, and an OR circuit configured to output an interruption signal for interrupting the execution of the target program based on the condition establishment signal or the second comparison result.

3. The debug system according to claim 2, wherein the counter circuit is a 1-bit counter configured to, when the first comparison result shows that the program counter value is the execution start address or less, add one bit to a counter, and output the condition establishment signal as 1 every time the counter overflows.

4. The debug system according to claim 2, wherein the break circuit further includes a first flag configured to indicate whether the first register is valid or invalid, and a second flag configured to indicate whether the second register is valid or invalid, the debug control unit is configured to set the first flag to valid when the plurality of break points include an address equal to or less than the program counter value, and set the second flag to valid when the plurality of break points include an address larger than the program counter value, and the break circuit is configured to validate the first comparison result when the first flag is valid, and validate the second comparison result when the second flag is valid.

5. The debug system according to claim 4, wherein the counter circuit is configured to output the condition establishment signal when the first flag is valid.

6. The debug system according to claim 1, wherein the storage unit is configured to further store a matched count that is the number of times that the program counter value matches with each of the plurality of break points, and an upper limit count which indicates an upper limit count of the matched count in association with each of the plurality of break points, and the debug control unit is configured to add the matched count associated with a matched break point when the program counter value matches with one of the plurality of break points, and keep interrupting the execution of the target program when the matched count after the addition reaches the upper limit count.

7. The debug system according to claim 2, wherein numbers of bits of the first and second registers are larger than a number of bits of the program counter value, the first comparator is configured to perform signed comparison between the execution start address set to the first register, and the program counter value, and the second comparator is configured to perform unsigned comparison between the minimum address set to the second register, and the program counter value.

8. A semiconductor device comprising:

a first register configured to hold an execution start address of a target program to which a plurality of break points are set;

a second register configured to hold an address that is larger than the execution start address and is minimum among the plurality of break points;

a first comparator configured to compare the execution start address set to the first register and a program counter value, and output a first comparison result;

a counter circuit configured to, when a condition that the first comparison result shows that the program counter value is the execution start address or less is established a plurality of times, output a condition establishment signal;

a second comparator configured to compare the minimum address set to the second register and the program counter value, and output a second comparison result; and an OR circuit configured to output an interruption signal for interrupting execution of the target program based on the condition establishment signal or the second comparison result.

* * * * *